US010697561B2

(12) United States Patent
McCarty et al.

(10) Patent No.: US 10,697,561 B2
(45) Date of Patent: Jun. 30, 2020

(54) METHOD OF MANUFACTURING A FLUID PRESSURE REDUCTION DEVICE

(71) Applicant: FISHER CONTROLS INTERNATIONAL LLC, Marshalltown, IA (US)

(72) Inventors: Michael W. McCarty, Marshalltown, IA (US); Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 25 days.

(21) Appl. No.: 15/899,173

(22) Filed: Feb. 19, 2018

(65) Prior Publication Data
US 2018/0340630 A1 Nov. 29, 2018

Related U.S. Application Data

(60) Provisional application No. 62/511,187, filed on May 25, 2017.

(51) Int. Cl.
*F16K 47/04* (2006.01)
*F16K 5/06* (2006.01)
(Continued)

(52) U.S. Cl.
CPC ............. *F16K 47/04* (2013.01); *F16K 1/52* (2013.01); *F16K 5/0605* (2013.01); *F16K 47/08* (2013.01); *F16L 55/033* (2013.01)

(58) Field of Classification Search
CPC . F16K 47/04; F16K 47/08; F16K 1/52; F16K 5/0605; F16L 55/033
See application file for complete search history.

(56) References Cited

U.S. PATENT DOCUMENTS 1,243,134 A * 10/1917 Binckley ............. G05D 16/163
137/485
1,342,955 A * 6/1920 Gebhardt ................ F16K 47/04
251/333
(Continued)

FOREIGN PATENT DOCUMENTS

DE 102015005611 A1 11/2016
DE 102015218905 A1 3/2017
(Continued)

OTHER PUBLICATIONS

International Search Report received for PCT/US2018/031743, dated Jul. 19, 2018.
(Continued)

*Primary Examiner* — Matthew W Jellett
*Assistant Examiner* — Christopher D Ballman
(74) *Attorney, Agent, or Firm* — Marshall, Gerstein & Borun LLP

(57) ABSTRACT

A method of custom manufacturing a fluid pressure reduction device for use in a process control valve. The method includes creating the fluid pressure reduction device using an additive manufacturing technique, which generally includes forming a body and forming a plurality of flow paths in the body. The body has an inner wall and an outer wall spaced radially outward of the inner wall. The flow paths are formed in the body between the inner wall and the outer wall of the body. Each of the flow paths includes an inlet aperture, an outlet aperture, and an intermediate section extending between the inlet and outlet apertures. At least a portion of the intermediate section extends in a substantially vertical direction that is substantially parallel to the longitudinal axis, such that the flow paths are able to utilize previously un-used space in the device.

22 Claims, 10 Drawing Sheets

(51) Int. Cl.
*F16K 1/52* (2006.01)
*F16L 55/033* (2006.01)
*F16K 47/08* (2006.01)

(56) References Cited

U.S. PATENT DOCUMENTS

| | | | | |
|---|---|---|---|---|
| 3,529,628 A * | 9/1970 | Cummins | ............... | F16K 47/08 137/625.3 |
| 3,954,124 A * | 5/1976 | Self | ............ | F16K 3/34 138/42 |
| 3,971,411 A * | 7/1976 | Baumann | ............... | F16K 1/54 137/625.3 |
| 4,068,683 A * | 1/1978 | Self | ............ | F16K 47/08 137/625.3 |
| 4,352,373 A * | 10/1982 | Kay | ............ | F16K 47/08 137/561 A |
| 4,397,331 A | 8/1983 | Medlar | | |
| 4,473,210 A * | 9/1984 | Brighton | ............... | F16K 47/045 137/625.3 |
| 4,617,963 A | 10/1986 | Stares | | |
| 4,921,014 A * | 5/1990 | Tartaglia | ............... | F16K 47/08 137/494 |
| 4,923,166 A * | 5/1990 | Raftis | ............ | F16K 7/06 251/127 |
| 5,020,571 A | 6/1991 | Tartaglia et al. | | |
| 5,803,119 A * | 9/1998 | Steinke | ............ | F16K 47/04 137/625.37 |
| 6,244,297 B1 * | 6/2001 | Baumann | ............... | F16K 47/08 137/625.3 |
| 6,394,134 B1 * | 5/2002 | Kwon | ............ | F16K 47/08 137/625.3 |
| 6,439,540 B1 * | 8/2002 | Tse | ............ | F02D 9/02 251/118 |
| 6,718,633 B1 * | 4/2004 | Glenn | ............ | F16K 47/08 137/625.3 |
| 6,926,032 B2 * | 8/2005 | Nawaz | ............ | F16K 47/04 137/625.33 |
| 6,935,370 B2 | 8/2005 | McCarty et al. | | |
| 6,935,615 B2 | 8/2005 | McCarty | | |
| 7,013,919 B2 * | 3/2006 | Beth | ............ | F16K 47/08 137/625.33 |
| 7,069,950 B1 * | 7/2006 | Bittner | ............ | F16K 47/08 137/625.37 |
| 7,178,782 B1 * | 2/2007 | York | ............ | F16K 5/12 137/625.3 |
| 8,474,484 B2 * | 7/2013 | Stepanov | ............ | F16K 47/08 137/625.33 |
| 8,826,938 B2 | 9/2014 | Moore | | |
| 9,022,071 B2 * | 5/2015 | Venkitasubramony | ............ | F16K 47/04 137/625.37 |
| 9,494,174 B2 * | 11/2016 | Pastecki | ............ | F15D 1/025 |
| 10,094,489 B2 * | 10/2018 | Freitas | ............ | F16K 47/08 |
| 2005/0199298 A1 * | 9/2005 | Farrington | ............ | F16K 47/08 137/625.37 |
| 2006/0049375 A1 * | 3/2006 | Gossett | ............ | F16J 15/0806 251/357 |
| 2010/0300542 A1 | 12/2010 | Haines et al. | | |
| 2016/0341335 A1 | 11/2016 | Adams et al. | | |
| 2017/0067579 A1 | 3/2017 | Glaun | | |
| 2017/0138507 A1 * | 5/2017 | Kluz | ............ | F16K 47/08 |
| 2019/0032815 A1 * | 1/2019 | McCarty | ............ | F16K 47/08 |

FOREIGN PATENT DOCUMENTS

| | | |
|---|---|---|
| EP | 2798247 A1 | 11/2014 |
| GB | 2207528 A | 2/1989 |
| WO | WO-2016187246 A1 | 11/2016 |

OTHER PUBLICATIONS

Written Opinion received for PCT/US2018/031743, dated Jul. 19, 2018.
International Search Report and Written Opinion for International Application No. PCT/US2018/033076, dated Oct. 24, 2018.
Fisher Cavitrol III One-, Two-, and Three-Stage Trims, Emerson Process Management; Cavitrol III Trims, Product Bulletin, Mar. 2012.

* cited by examiner

METHOD OF MANUFACTURING A FLUID PRESSURE REDUCTION DEVICE

FIELD OF THE DISCLOSURE

The present disclosure generally relates to fluid pressure reduction devices, and, more particularly, to a method of manufacturing a device that more efficiently and effectively reduces fluid pressure in a process control system.

BACKGROUND

In process control systems, such as distributed or scalable process control systems commonly found in chemical, petroleum, power generation, or other industrial processes, it is often necessary to reduce the pressure of a fluid. However, pressure reduction typically leads to increased levels of unwanted noise and/or vibration. Thus, process control systems often employ flow reduction devices that aim to reduce fluid pressure in a manner that does not lead to increased levels of noise and/or vibration.

U.S. Pat. No. 6,935,370 ("the '370 Patent") illustrates several different examples of fluid pressure reduction devices each taking the form of a plurality of stacked disks that, when employed in a fluid flow control valve, reduce the pressure of a fluid flowing therethrough. One example, illustrated in FIG. 5 of the '370 Patent, features a plurality of stacked annular disks rotated relative to one another to create flow paths 62 that each provide multi-stage pressure reduction. Each disk 60 of the stack has a laser cut profile defining a horizontal, spiral flow path 62 that extends from an inlet section 68, through an intermediate section 70 formed of a series of flat leg portions and including restrictions 74, 76, and to an outlet section 72 having a larger cross-sectional area than the inlet section 68. Another example, illustrated in FIG. 8 of the '370 Patent, features an annular disk 130 that defines intersecting fluid flow paths 136, 138 so that fluid flowing therein collides, thereby releasing energy and reducing fluid pressure.

SUMMARY

In accordance with a first exemplary aspect of the present invention, a fluid pressure reduction device for use in a fluid flow control device. The fluid pressure reduction device includes a unitary body and a plurality of flow paths. The unitary body has an inner wall and an outer wall spaced radially outward of the inner wall, the unitary body extending along a longitudinal axis. The flow paths are defined between the inner wall and the outer wall of the unitary body. Each of the flow paths includes an inlet aperture, an outlet aperture, and an intermediate section extending between the inlet and outlet apertures. At least a portion of the intermediate section extends in a direction that is substantially parallel to the longitudinal axis.

In accordance with a second exemplary aspect of the present invention, a fluid pressure reduction device for use in a fluid flow control device. The fluid pressure reduction device includes a unitary body and a plurality of flow paths. The unitary body includes a central opening and a perimeter surrounding the central opening, the perimeter having a top end and a bottom end opposite the top end. The flow paths are defined in the perimeter of the unitary body, each of the flow paths including an inlet aperture, an outlet aperture, and an intermediate section connecting the inlet and outlet apertures. The intermediate section extends between a position proximate the bottom end of the body and a position proximate the top end of the body.

In accordance with a third exemplary aspect of the present invention, a method of manufacturing is provided. The method includes creating a fluid pressure reduction device using an additive manufacturing technique. The creating includes: forming a body having an inner wall and an outer wall spaced radially outward of the inner wall, the body extending along a longitudinal axis; and forming a plurality of flow paths in the body between the inner wall and the outer wall of the body. Each of the flow paths includes an inlet aperture, an outlet aperture, and an intermediate section extending between the inlet and outlet apertures, wherein at least a portion of the intermediate section extends in a direction that is substantially parallel to the longitudinal axis.

In further accordance with any one or more of the foregoing first, second, and third exemplary aspects, a fluid pressure reduction device and/or a method of manufacturing may include any one or more of the following further preferred forms.

In one preferred form, a substantial portion of the intermediate section extends in the direction.

In another preferred form, the unitary body has a length defined between a top end and a bottom end of the unitary body, and at least the portion of the intermediate section extending in the vertical direction travels at least a majority of the length of the unitary body.

In another preferred form, the inlet and outlet apertures are oriented along an axis that is substantially perpendicular to the longitudinal axis.

In another preferred form, a plurality of pressure restrictions are defined in the intermediate section.

In another preferred form, the intermediate section includes a first vertical portion connected to the inlet portion and substantially parallel to the longitudinal axis, a second vertical portion that is connected to the outlet portion and substantially parallel to the longitudinal axis, and a curved portion that connects the first and second vertical portions.

In another preferred form, the inlet and outlet apertures are positioned proximate a bottom end of the unitary body, and a curved portion of the intermediate section is positioned proximate a top end of the unitary body.

In another preferred form, a first flow path and a second flow path of the plurality of flow paths share a common intermediate section.

In another preferred form, the intermediate section includes a first vertical portion that is connected to the inlet section and substantially parallel to the longitudinal axis, a second vertical portion that is connected to the outlet section and substantially parallel to the longitudinal axis, and a plurality of intermediate apertures that connect the first and second vertical portions and are substantially perpendicular to the longitudinal axis.

In another preferred form, the inlet aperture has a first diameter, the intermediate apertures of the intermediate section each have a second diameter larger than the first diameter, and the outlet aperture has a third diameter larger than the second diameter.

In another preferred form, the perimeter is defined by an inner wall and an outer wall spaced radially outward of the inner wall, and the flow paths are defined between the inner wall and the outer wall.

In another preferred form, the unitary body extends along a longitudinal axis, and the intermediate section includes a first vertical portion that is connected to the inlet aperture and substantially parallel to the longitudinal axis, a second vertical portion that is connected to the outlet section and substantially parallel to the longitudinal axis, and a curved portion that connects the first and second vertical portions.

In another preferred form, the inlet and outlet apertures are positioned proximate the bottom end of the unitary body, and a curved portion of the intermediate section is positioned proximate the top end of the unitary body.

In another preferred form, the unitary body extends along a longitudinal axis, and the intermediate section includes a first vertical portion that is connected to the inlet aperture and substantially parallel to the longitudinal axis, a second vertical portion that is connected to the outlet aperture and substantially parallel to the longitudinal axis, and a plurality of intermediate apertures that connect the first and second vertical portions and are substantially perpendicular to the longitudinal axis.

In another preferred form, the inlet aperture has a first diameter, each of the intermediate apertures has a second diameter larger than the first diameter, and the outlet aperture has a third diameter larger than the second diameter.

In another preferred form, the additive manufacturing technique includes 3D printing.

In another preferred form, the act of forming the plurality of flow paths in the body includes forming the intermediate section to include a first vertical portion connected to the inlet section and being substantially parallel to the longitudinal axis, a second vertical portion that is connected to the outlet section and being substantially parallel to the longitudinal axis, and a curved portion that connects the first and second vertical portions.

In another preferred form, the act of forming the plurality of flow paths in the body includes forming the intermediate section to include a first vertical portion that is connected to the inlet aperture and substantially parallel to the longitudinal axis, a second vertical portion that is connected to the outlet aperture and being substantially parallel to the longitudinal axis, and a plurality of intermediate apertures that connect the first and second vertical portions and are substantially perpendicular to the longitudinal axis.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is generally directed to a method of manufacturing a device that more effectively reduces fluid pressure than conventional fluid pressure reduction devices (e.g., the stacked disks 100 described above) and, at the same time, is easier and less costly to manufacture than such conventional fluid pressure reduction devices. The method described herein utilizes cutting edge manufacturing techniques, e.g., additive manufacturing, to facilitate custom manufacturing of a fluid pressure reduction device such that any number of different flow paths can be developed and incorporated into a unitary or single body, depending upon the given application. Thus, the fluid pressure reduction device can, for example, include complex flow paths that utilize substantially the entire profile of the device (as opposed to conventional fluid pressure reduction devices, which typically have a significant amount of unused, or dead, space), thereby maximizing (or at least enhancing) flow path lengths and, in turn, maximizing (or at least enhancing) the pressure reduction capabilities of the device.

Figure 1:
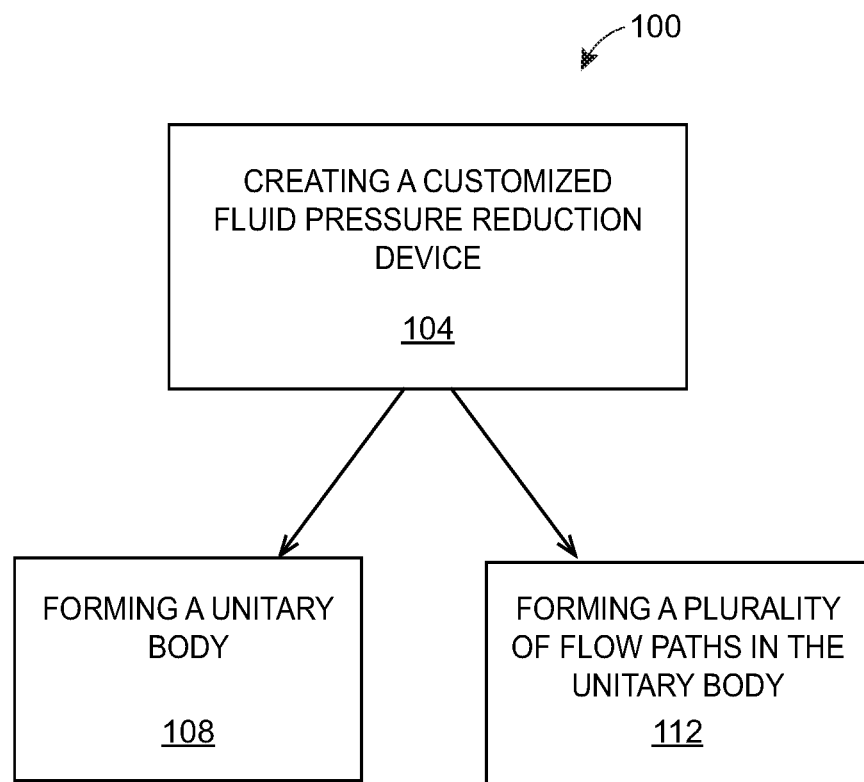
FIG. 1 is a schematic diagram of one example of a process or method according to the teachings of the present disclosure for manufacturing a fluid pressure reduction device.

FIG. 1 is a diagram of an example of a method or process 100 according to the teachings of the present invention. The method or process 100 schematically depicted in FIG. 1 is a method or process of custom manufacturing a fluid pressure reduction device such as a valve trim component (e.g., a valve cage). Like the conventional fluid pressure reduction devices described above (e.g., the stack of disks 100), fluid pressure reduction devices manufactured according to the method or process 100 are configured to reduce the pressure of the fluid flowing therethrough, but, as described above, are easier and less costly to manufacture than conventional fluid pressure reduction devices and are, at the same time, just as if not more effective as conventional fluid pressure reduction devices.

More specifically, the method 100 includes the act 104 of creating a customized fluid pressure reduction device, using an additive manufacturing technique, based on the given application. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The act 104 of creating the customized fluid pressure reduction device includes forming a unitary or single body (act 108) and forming a plurality of flow paths in the unitary or single body (act 112). The unitary body can be made of one or more suitable materials, such as, for example, stainless steel, aluminum, various alloys, and, by virtue of being customizable, can be any number of different shapes and/or sizes. As an example, the unitary body may take the form of a hollow cylinder defined by an inner wall and an outer wall spaced radially outward of the inner wall. The flow paths formed in the body are generally configured to reduce the pressure of a fluid flowing therethrough. As discussed above, the usage of additive manufacturing techniques to custom manufacture the fluid pressure reduction device allows the flow paths to be formed based upon the desired application. In other words, the flow paths are customizable. By virtue of being customizable, the flow paths can be unique and complex (as opposed to simple), have any number of different lengths, have any number of different sizes and/or shapes in cross-section, and/or be arranged in any number of different patterns. As a result, one or more of the flow paths may be formed to include or define multiple different pressure stages (e.g., a first pressure stage and a second pressure stage where pressure is less than the pressure in the first pressure stage), one or more of the flow paths may be partially or even substantially non-horizontal (i.e., include vertical components), one or more of the flow paths can vary in shape and/or size as the fluid passes therethrough, one or more of the flow paths can vary from one or more other flow paths, the flow paths can be staggered or offset from one another (either horizontally or vertically) throughout the unitary body, one or more of the flow paths can extend between a position proximate a top end of the unitary body and a bottom end of the unitary body (e.g., travel or extend a substantial portion of the length of the unitary body), such that virtually the entire profile of the device is utilized, or combinations thereof.

It will be appreciated that the act 104 (and the acts 108, 112) can be performed any number of different times. The act 104 can, for example, be performed multiple times so as to create multiple fluid pressure reduction devices for use in a single process control valve, with each fluid pressure reduction device created for a specific application. The act 104 can, alternatively or additionally, be performed multiple times so as to create fluid pressure reduction devices for use in multiple similar or different process control valves.

FIGS. 2A-2E illustrate a first example of a fluid pressure reduction device 200 custom manufactured using the method or process 100. The fluid pressure reduction device 200 in this example takes the form of a valve cage that can be disposed in a valve body of a process control valve (e.g., a sliding stem valve). The fluid pressure reduction device 200 has a single or unitary body 204 and a plurality of flow paths 208 formed or defined in the unitary body 204 to reduce the pressure of a fluid flowing through the body 204. As will be discussed in greater detail below, the flow paths 208 are formed in the unitary body 204 in a manner that utilizes virtually the entire profile of the device 200, thereby maximizing (or at least increasing) the lengths of the flow paths 208 and, in turn, maximizing (or at least enhancing) the pressure reduction capabilities of the device 200.

Figure 2A:
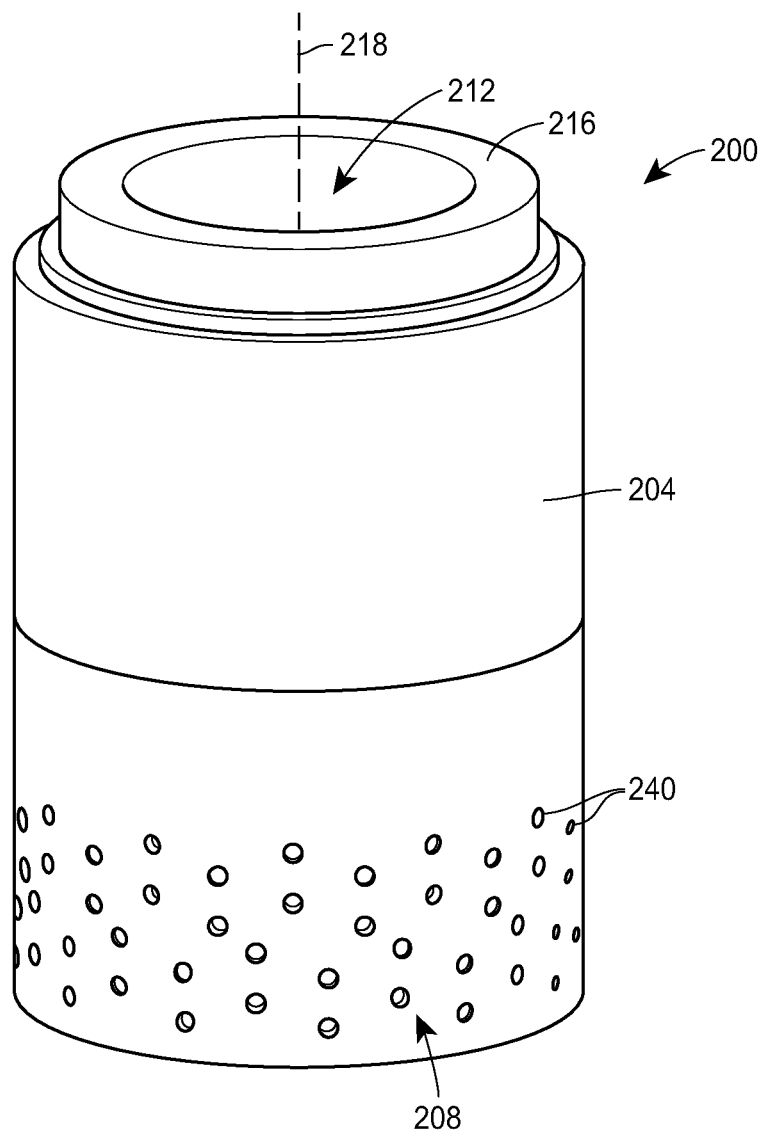
FIG. 2A is a perspective view of a first example of a fluid pressure reduction device manufactured according to the process of FIG. 1.
Figure 2B:
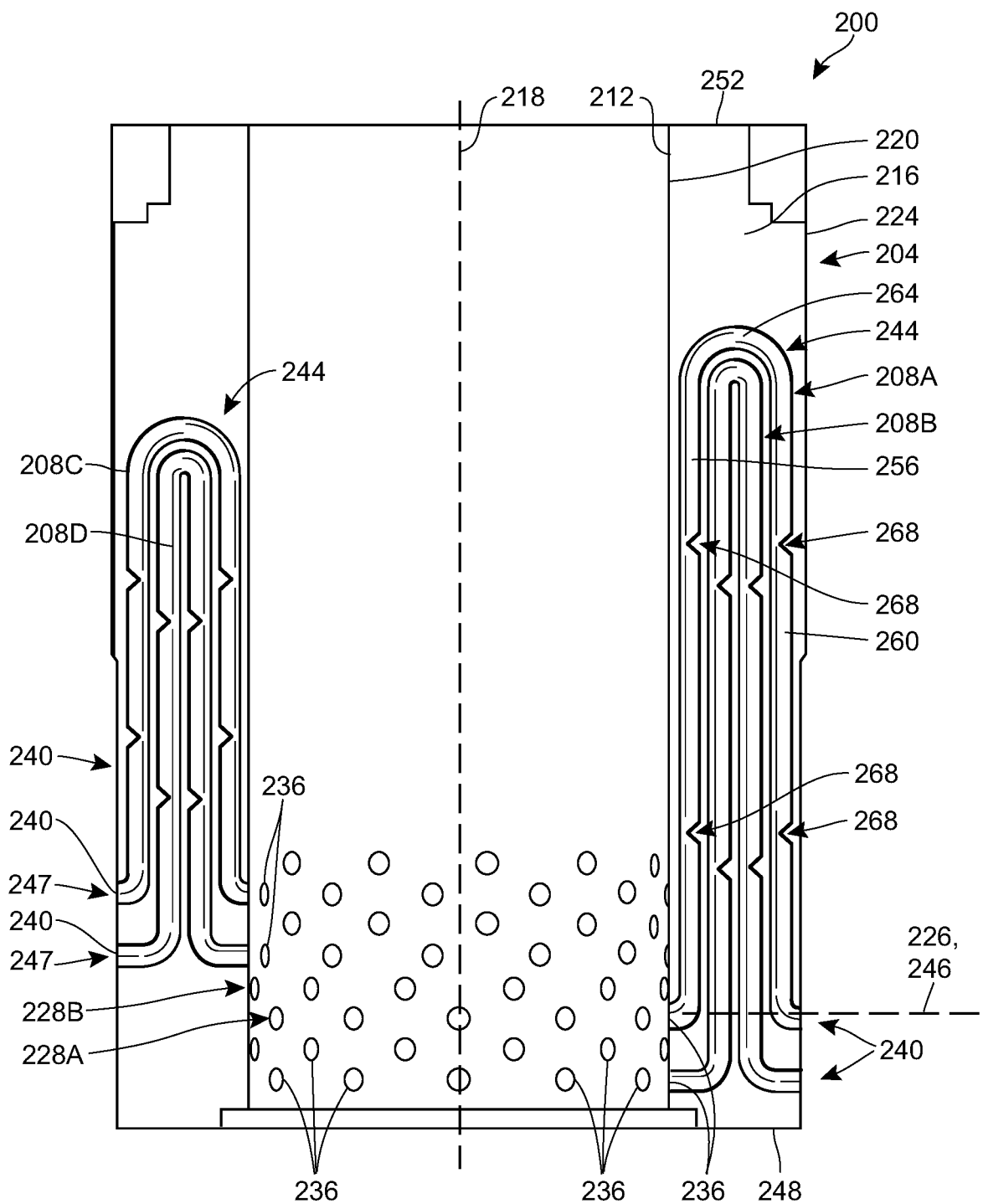
FIG. 2B is a cross-sectional view of the fluid pressure reduction device of FIG. 2A.
Figure 2C:
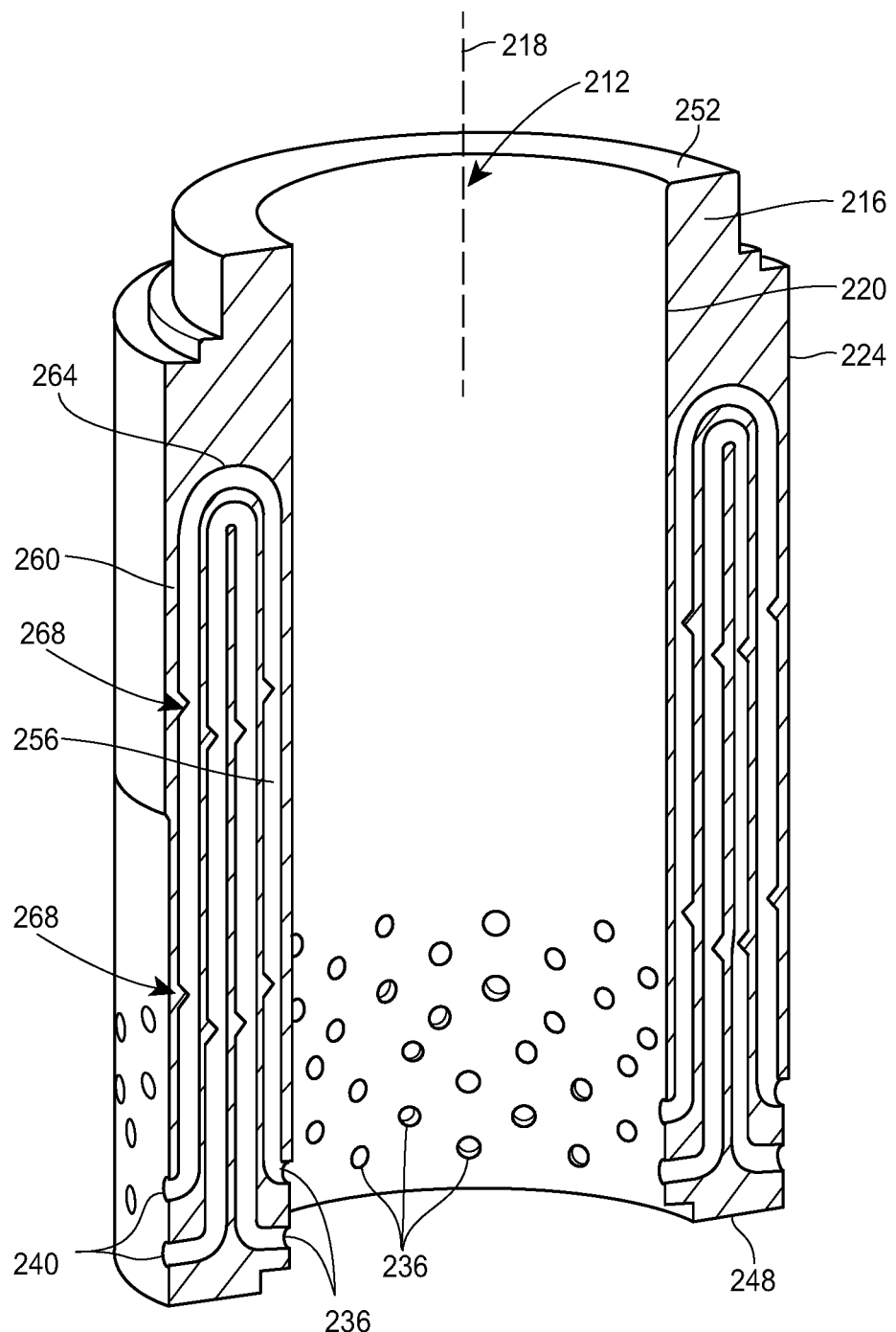
FIG. 2C is another cross-sectional view of the fluid pressure reduction device of FIG. 2A.
Figure 2D:
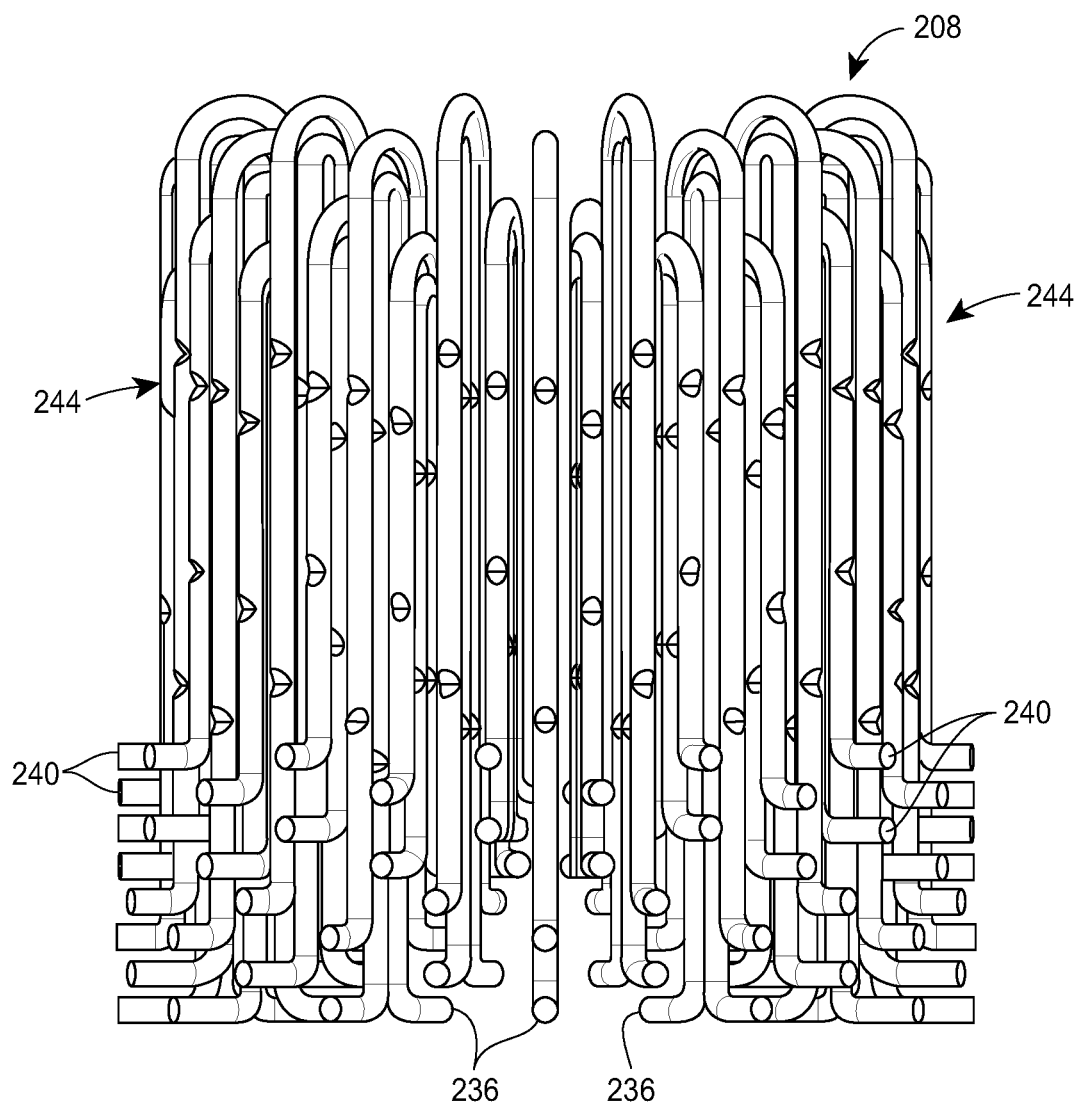
FIG. 2D is a front, plan view of the fluid pressure reduction device of FIG. 2A, showing a plurality of flow paths but with the rest of the device removed for clarity.
Figure 2E:
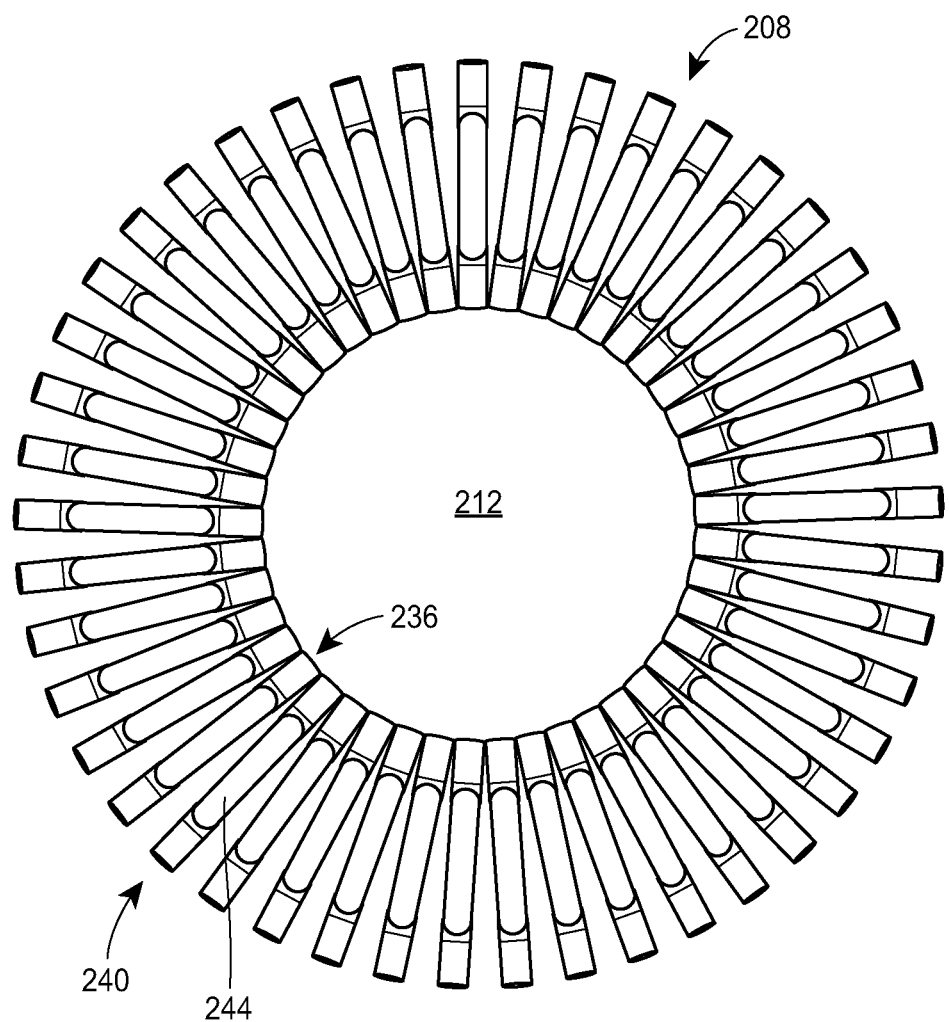
FIG. 2E is a top, plan view of the fluid pressure reduction device of FIG. 2A, showing a plurality of flow paths but with the rest of the device removed for clarity.

As illustrated in FIGS. 2A-2C, the body 204 has a central opening 212 and a substantially cylindrical perimeter 216 surrounding the central opening 212. The central opening 212 extends along a central longitudinal axis 218 and is sized to receive a valve plug of the process control valve that is movably disposed therein to control fluid flow through the process control valve. The substantially cylindrical perimeter 216 is defined by an inner wall 220 (which in turn defines the central opening 212) and an outer wall 224 that is spaced radially outward of the inner wall 220.

As illustrated, the flow paths 208 are formed in the perimeter 216 between the inner and outer walls 220, 224, and are circumferentially arranged around the central opening 212. Each of the flow paths 208 has a circular shape in cross-section and includes an inlet aperture 236, an outlet aperture 240, and an intermediate section 244 extending between the inlet and outlet apertures 236, 240.

The inlet apertures 236 are formed in and through the inner wall 220 (and, thus, in direct fluid communication with the central opening 212), with each oriented along a first axis (e.g., first axis 226) that is substantially perpendicular (e.g., exactly perpendicular) to the longitudinal axis 218. The inlet apertures 236 of the flow paths 208 are arranged in a plurality of rows 228, with alternating rows 228 of inlet apertures 236 staggered or offset from one another. For example, inlet apertures 236 in row 228A are staggered or offset from inlet apertures 236 in row 228B, which is adjacent row 228A. Staggering the inlet apertures 236 in this manner helps to achieve a balanced fluid flow throughout the fluid pressure reduction device 200, though it is not necessary that the inlet apertures 236 be staggered in this manner (or at all).

The outlet apertures 240 are formed in and through the outer wall 224, with each oriented along a second axis (e.g., second axis 246) that is substantially co-axial, if not exactly co-axial, with the first axis (e.g., the first axis 226) (and thus substantially perpendicular, if not exactly perpendicular, to the longitudinal axis 218). The outlet apertures 240 are, like the inlet apertures 236, arranged in a plurality of rows 247, with alternating rows 247 of outlet apertures 240 staggered or offset from one another in a similar manner as the alternating rows 228 of inlet apertures 236. In other examples, however, the outlet apertures 240 can be staggered or offset in a different manner (e.g., from one another, from the inlet apertures 236) or not at all.

The intermediate sections 244 in this example are U-shaped and extend from a position proximate a bottom end 248 of the body 204 (where the sections 244 are connected to the inlet apertures 236, respectively), upward within the perimeter 216 toward a top end 252 of the body 204, and back downward to a position proximate the bottom end 248 (where the sections 244 are connected to the outlet apertures 240, respectively). In other words, the intermediate sections 244 of each flow path 208 sweep or travel upward and back downward, i.e., 180 degrees. Thus, as illustrated, each intermediate section 244 has a first vertical portion 256, e.g., a vertical chamber, that is connected to the respective inlet aperture 236 and is substantially parallel to the longitudinal axis 218, a second vertical portion 260, e.g., a vertical chamber, that is connected to the respective outlet aperture 240 and is substantially parallel to the longitudinal axis 218, and a curved portion 264, e.g., a curved chamber, located above the inlet and outlet apertures 236, 240, which connects the first and second vertical portions 256, 260 to one another.

So arranged, a substantial portion of the intermediate section 244 of each of the flow paths 208 is oriented in a substantially vertical direction (i.e., substantially parallel to the longitudinal axis 218), if not an exactly vertical direction (i.e., exactly perpendicular to the longitudinal axis 218). And because in this example the intermediate section 244 comprises a substantial portion of each of the flow paths 208, a substantial portion of each of the flow paths 208 in this example is oriented in the substantially vertical direction (or exactly vertical direction). In other examples, however, this need not be the case. In some examples, a greater portion of the intermediate section 244 can be oriented in a non-vertical direction, e.g., angled relative to the longitudinal axis 218. Alternatively or additionally, the inlet and outlet apertures 236, 240 may comprise a greater portion of each of the flow paths 208, such that the intermediate section 244 comprises a majority, but not substantial, portion of each of the flow paths 208.

Each intermediate section 244 in this example also includes a plurality of pressure restrictions 268, each formed by narrowing the intermediate section 244, for the purpose of producing additional pressure reduction by staging. In the illustrated example, each intermediate section 244 includes four pressure restrictions 268 spaced apart from one another throughout the length of the intermediate section 244. In other examples, more or less pressure restrictions 268 can be utilized (to produce more or less pressure reduction).

It will be appreciated that the intermediate sections 244 of different flow paths 208 (and more particularly the curved portions 264 of those sections 244) will extend or travel upward to different points within the perimeter 216. In other words, some intermediate sections 244 will be positioned closer to the top end 252 of the body 204 than other intermediate sections 244. As an example, the intermediate section 244 of flow path 208A extends to a position that is higher, i.e., closer to the top end 252 of the body 204, than the intermediate section 244 of flow path 208B. The flow paths 208 therefore together span substantially the entire perimeter 216. In other words, the flow paths 208 are formed throughout the perimeter 216, from the bottom end 248 to the top end 252 of the body 204, thereby maximizing the lengths of the flow paths 208 by leaving little, if any, un-used upper dead space in the fluid pressure reduction device 200 (unlike conventional fluid pressure reduction devices).

It will also be appreciated that one or more intermediate sections 244 can vary in length from one or more other intermediate sections 244, such that one or more flow paths 208 are longer (or shorter) than one or more other flow paths 208. This allows for variable pressure reduction within the pressure reduction device 200, with longer flow paths 208 configured to reduce fluid pressure to a greater degree than the other flow paths 208. As an example, the flow paths 208A, 208B, which have inlet and outlet apertures 236, 240, respectively, formed closer to the bottom end 248 than the inlet and outlet apertures 236, 240 of flow paths 208C, 208D, can be formed to be longer than the flow paths 208C, 208D so as to effectively accommodate greater pressure changes that may occur as the valve plug of the process control valve first begins to move to the open position (not shown), exposing the inlet aperture 236 of the flow paths 208A, 208B. As the valve plug opens further, exposing additional flow paths 208 like the flow paths 208C, 208D, shorter flow paths may be utilized, as lesser changes in pressure need to be accommodated. At the same time, these additional, shorter flow paths effectively manage any differential pressure changes.

In other examples, the inlet aperture 236 of each of the flow paths 208 can be formed in and through the outer wall 224 (instead of the inner wall 220), and the outlet aperture 240 of each of the flow paths 208 can be formed in and through the inner wall 220 (instead of the outer wall 224), such that fluid flows in the opposite direction (from outer diameter to inner diameter) through the fluid pressure reduction device 200. Moreover, in other examples, the intermediate section 244 of each of the flow paths 208 can vary in shape and/or size from those depicted in FIGS. 2A-2E. As an example, the intermediate sections 244 can include one or more portions that extend downward, below the inlet and outlet apertures 236, 240, such that the device 200 provides a flow down configuration (rather than a flow up configuration). Further, while the flow paths 208 in this example each have a constant diameter, the flow paths 208 can, in other examples, have a variable diameter (e.g., by tapering the intermediate sections 244), thereby providing recovery area for fluid flowing therethrough.

When the fluid pressure reduction device 200 is in operation (in a valve body of a process control valve), and the valve plug is moved to a partially open position (exposing some of the inlet apertures 236) or a fully open position (exposing all of the inlet apertures 236), fluid will flow from the valve body into the exposed inlet apertures 236 of the flow paths 208 via the central opening 212. Fluid will then flow into and through the intermediate sections 244 of the flow path 208. As fluid travels or sweeps upward (via the first vertical portion 256), fluid drags across or along an outer profile of each intermediate section 244 while gravity acts on the fluid, thereby reducing the velocity of the fluid. Along the way, the fluid encounters the pressure restrictions 268 in each intermediate section 244, which respectively facilitate additional pressure reduction. The pressure of the fluid is thus reduced to a fluid pressure that is less than its initial fluid pressure. As fluid travels or sweeps back downward (via the second vertical portions 260), fluid continues to drag across or along an outer profile of the intermediate sections 244, thereby further reducing the velocity of the fluid. The fluid again encounters pressure restrictions 268 along the way, which facilitate additional pressure reduction. The pressure of the fluid is thus further reduced. The reduced pressure fluid then flows out of the pressure reduction device 200 (and into the valve body) via the outlet apertures 240 of the flow paths 208. In this manner, the device 200 reduces the pressure of the fluid flowing therethrough (and thus through the process control valve). However, by employing complex flow paths 208 that utilize substantially the entire profile of the device 200 to do so, the device 200 more effectively reduces fluid pressure than conventional fluid pressure reduction devices.

FIGS. 3A-3D illustrate a second example of a fluid pressure reduction device 300 custom manufactured using the method or process 100. The fluid pressure reduction device 300 in this example also takes the form of a valve cage that can be employed in a valve body of a process control valve (e.g., a sliding stem valve). The fluid pressure reduction device 300 is a stage-wise pressure reduction device that has a single or unitary body 304 and a plurality of flow paths 308 formed or defined in the unitary body 304 to reduce the pressure of a fluid flowing through the body 304. As with the flow paths 208, the flow paths 308 are formed in the unitary body 304 in a manner that utilizes virtually the entire profile of the device 300, thereby maximizing (or at least increasing) the lengths of the flow paths 308 and, in turn, maximizing (or at least enhancing) the pressure reduction capabilities of the device 300.

Figure 3A:
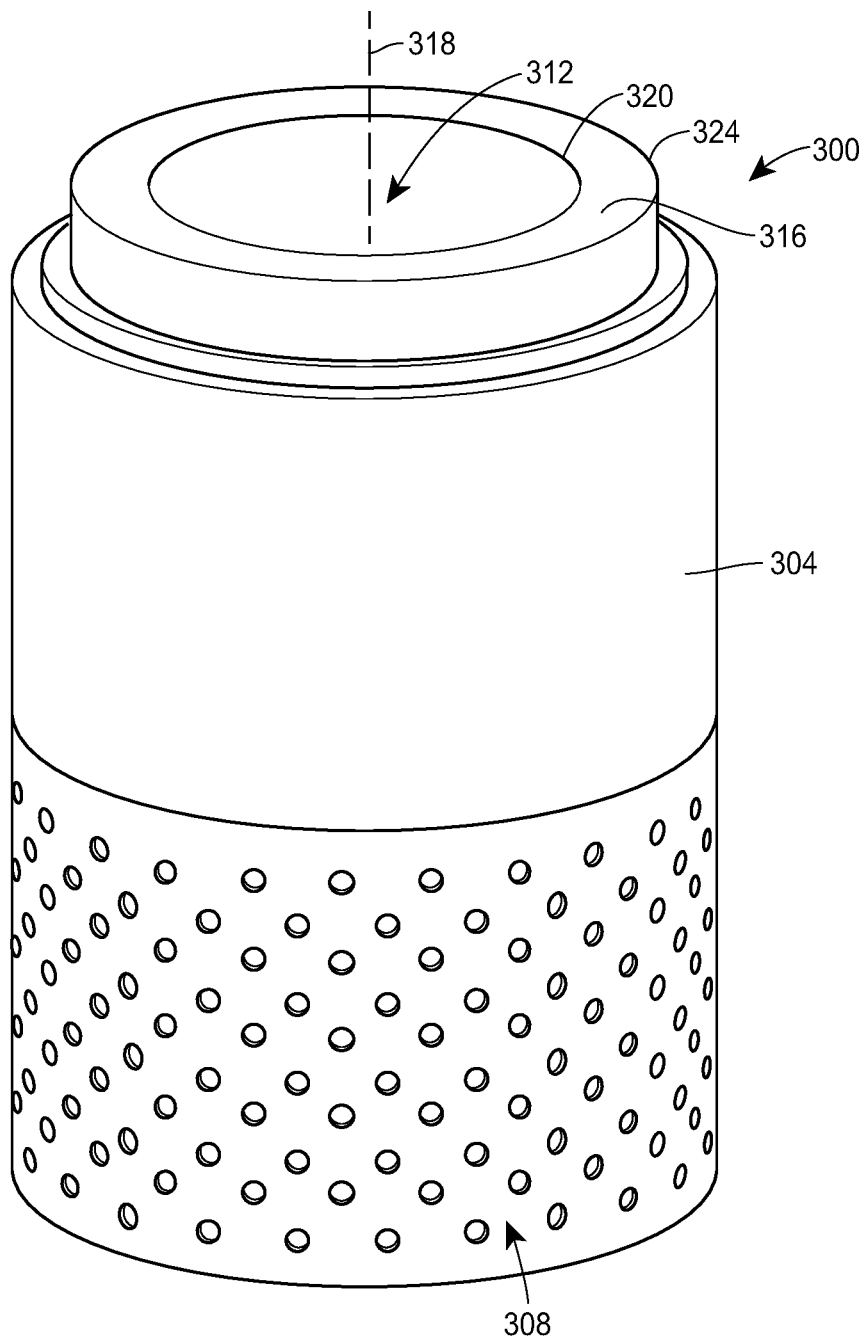
FIG. 3A is a perspective view of a second example of a fluid pressure reduction device manufactured according to the process of FIG. 1.
Figure 3B:
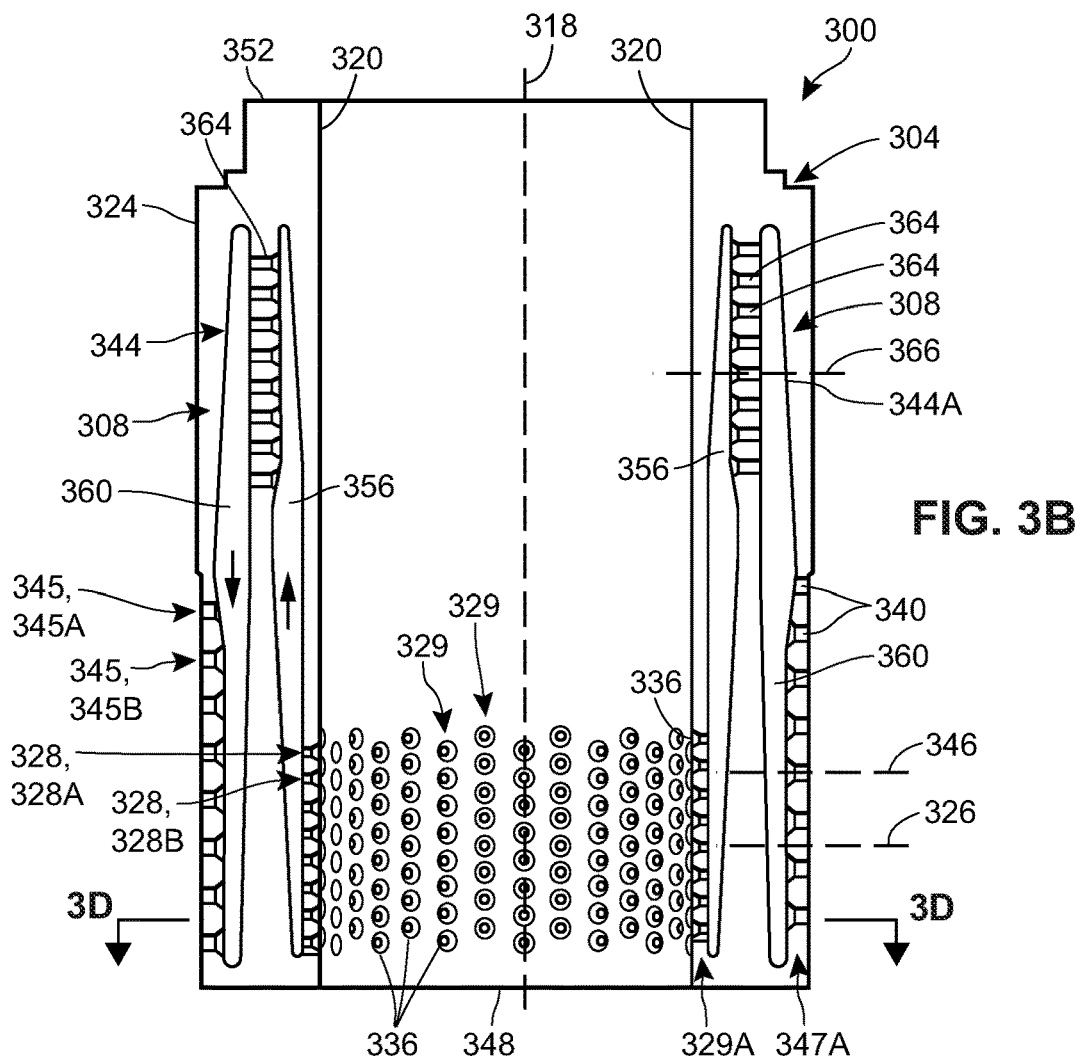
FIG. 3B is a cross-sectional view of the fluid pressure reduction device of FIG. 3A.
Figure 3D:
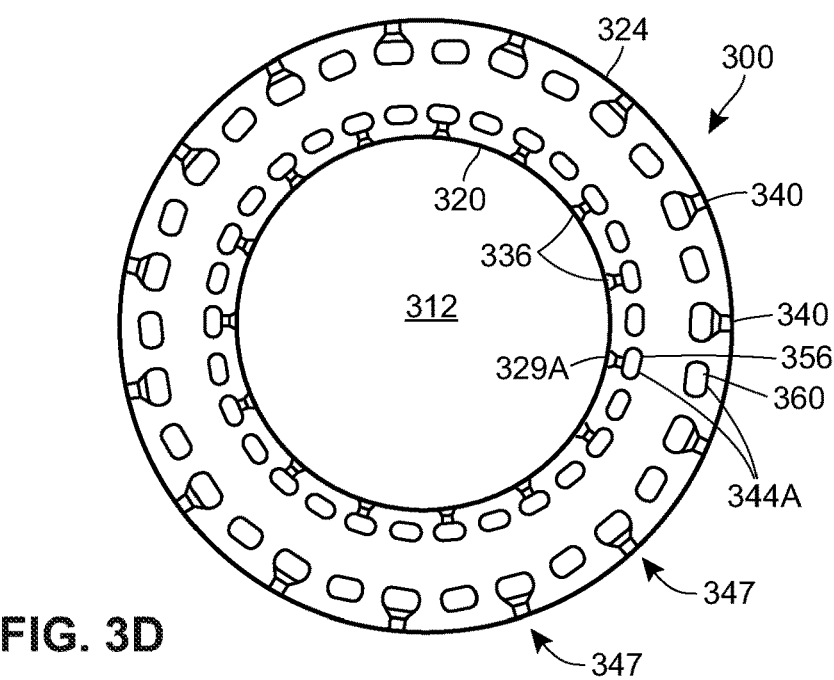
FIG. 3D is a cross-sectional view taken along line 3D-3D in FIG. 3C.
Figure 3C:
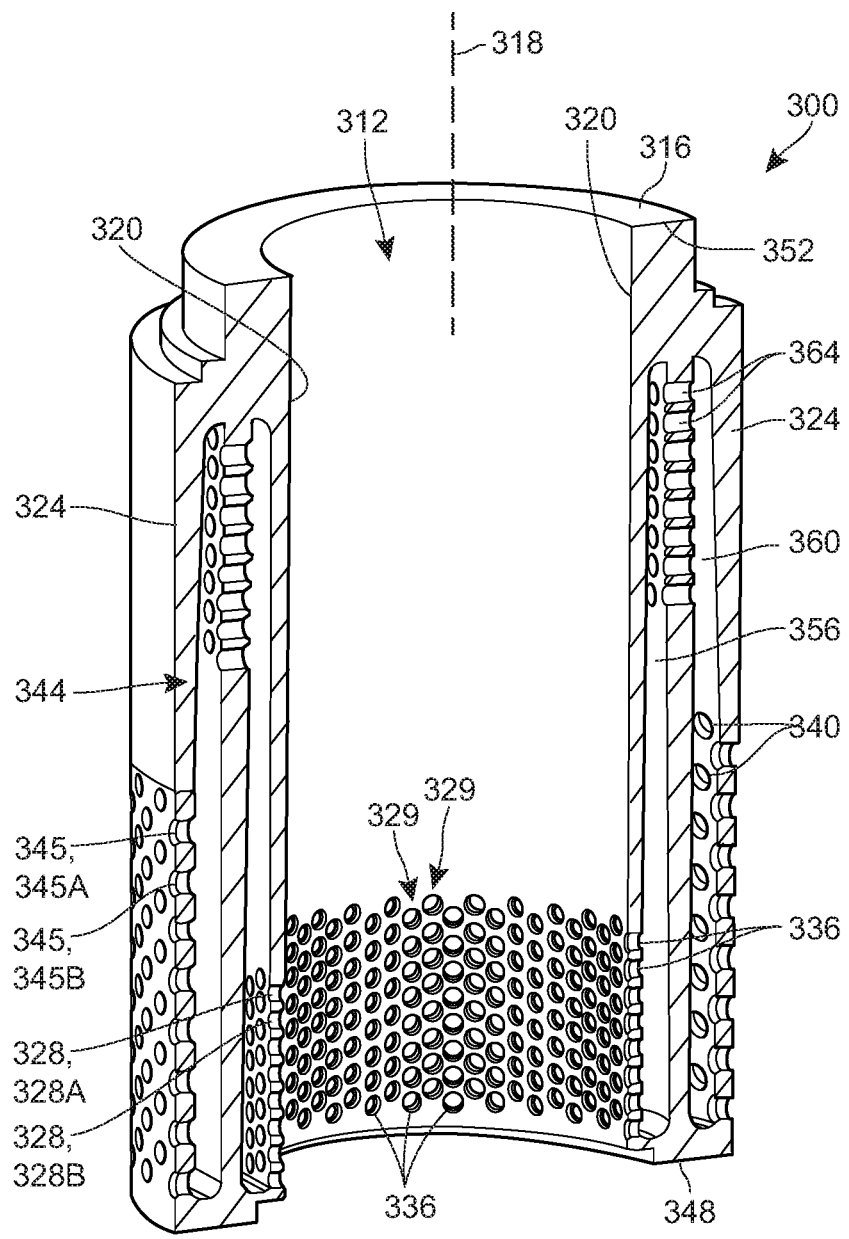
FIG. 3C is another cross-sectional view of the fluid pressure reduction device of FIG. 3A.

As illustrated in FIGS. 3A, 3B, and 3C, the body 304 has a central opening 312 and a substantially cylindrical perimeter 316 surrounding the central opening 312. The central opening 312 extends along a central longitudinal axis 318 and is sized to receive a valve plug of the process control valve that is movably disposed therein to control fluid flow through the process control valve. The substantially cylindrical perimeter 316 is defined by an inner wall 320 (which in turn defines the central opening 312) and an outer wall 324 that is spaced radially outward of the inner wall 320.

As best illustrated in FIGS. 3A-3D, the flow paths 308 are formed in the perimeter 316 between the inner and outer walls 320, 324, and are circumferentially arranged around the central opening 312. Each of the flow paths 308 has a variable shape in cross-section defined in part by an inlet aperture 336 and an outlet aperture 340.

The inlet apertures 336 are formed in and through the inner wall 320 (and, thus, in direct fluid communication with the central opening 212), with each oriented along a first axis (e.g., first axis 326) that is substantially perpendicular (e.g., perpendicular) to the longitudinal axis 318. The inlet apertures 336 are arranged in a plurality of rows 328 and a plurality of columns 329, with alternating rows 328 of inlet apertures 336 staggered or offset from one another and alternating columns 329 of inlet apertures 336 staggered or offset from one another. For example, inlet apertures 336 in row 328A are staggered or offset from inlet apertures 336 in row 328B, which is adjacent row 328A, and inlet apertures 336 in column 329A are staggered or offset from inlet apertures 336 in column 329B, which is adjacent column 329A. As discussed above, staggering the inlet apertures 336 in this manner helps to achieve a balanced fluid flow throughout the fluid pressure reduction device 300, though it is not necessary that the inlet sections 336 be staggered in this manner (or at all).

The outlet apertures 340 are formed in and proximate the outer wall 324, with each oriented along a second axis (e.g., second axis 346) that is substantially parallel to but spaced from the first axis 326 (and thus substantially perpendicular to the longitudinal axis 318). The outlet apertures 340 are, like the inlet apertures 336, arranged in a plurality of rows 345 and a plurality of columns 347 (best seen in FIG. 3D). While the alternating columns 347 are staggered or offset from one another in a similar manner as the alternating columns 329, the alternating rows 345 are staggered or offset from one another in a different manner than the alternating rows 328. As illustrated in FIGS. 3B and 3C, the alternating rows 345 of outlet apertures 340 are spaced further apart from one another than the alternating rows 328 of inlet apertures 336. Thus, as an example, the distance between outlet apertures 340 in row 345A and outlet apertures 340 in row 345B is greater than the distance between inlet apertures 336 in the row 328A (which are respectively associated with the outlet apertures 340 in row 345A) and inlet apertures 336 in the row 328B (which are respectively associated with the outlet apertures 340 in row 345B). As a result, the outlet apertures 340 span a greater portion of the perimeter 316 of the body 304 than the inlet apertures 336, and, as such, are positioned closer to the top end 352 of the body 304 than the inlet apertures 336 with which they are associated. In the illustrated example, the outlet apertures 340 span a portion of the perimeter 316 that is twice as large as the portion of the perimeter 316 spanned by the inlet apertures 336, though this difference can vary.

In other examples, the inlet aperture 336 of each of the flow paths 308 can be formed in and through the outer wall 324 (instead of the inner wall 320), and the outlet aperture 340 of each of the flow paths 308 can be formed in and through the inner wall 320 (instead of the outer wall 324), such that fluid flows in the opposite direction (from outer diameter to inner diameter) through the fluid pressure reduction device 300.

Each of the flow paths 308 is also defined by an intermediate section 344 that extends between a respective one of the inlet apertures 336 and a respective one of the outlet apertures 340, and is shared with a plurality of other associated flow paths 308. In other words, the fluid pressure reduction device 300 includes a plurality of common intermediate sections 344. In the illustrated example, each intermediate portion 344 serves as the common intermediate portion for flow paths 308 including inlet apertures 336 in the same column 329 of inlet apertures 336 and, in turn, all of the outlet apertures 340 in the column 347 of outlet apertures 340 respectively associated with that column 329 of inlet apertures 336. As an example, intermediate portion 344A serves as the common intermediate portion for the flow paths 308 including the inlet apertures 336 in column 329A and the outlet apertures 340 in column 347A (which is associated with column 329A). In other examples, however, the intermediate portions 344 can serve as common intermediate portions for differently associated flow paths 308.

As illustrated in FIGS. 3B and 3C, the intermediate portions 344 in this example are somewhat V-shaped and extend from a position immediately proximate a bottom end 348 of the body 304 (where each portion 344 is connected to the inlet apertures 336 associated therewith), upward within the perimeter 316 toward and to a position immediately proximate the top end 352 of the body 304, and back downward to a position immediately proximate to the bottom end 348 (where each portion 344 is connected to the outlet apertures 340 associated therewith). As illustrated, each intermediate portion 344 has a first chamber 356 that is connected to the respective inlet apertures 336 associated therewith, a second chamber 360 that is connected to the respective outlet section 340 associated therewith, and a plurality of intermediate apertures 364 that connect the first and second chambers 356, 360. While not illustrated herein, each intermediate portion 344 may optionally include one or more pressure restrictions, e.g., the pressure restrictions 268 described above, for the purpose of producing additional pressure reduction by staging.

The first chamber 356 in this example extends in a substantially vertical direction, but is oriented at a slight angle relative to the longitudinal axis 318, such that the first chamber 356 is angled slightly radially outward, toward the outer wall 324, as the first chamber 356 extends upward to the intermediate flow aperture 364. The second chamber 360 in this example also extends in a substantially vertical direction, but is oriented at a slight angle relative to the longitudinal axis 318, such that the second chamber 360 is angled slightly radially outward, toward the outer wall 324, as the second chamber 360 extends downward away from the flow aperture 364. As illustrated, the first and second chambers 356, 360 are tapered, which helps to promote a gradual fluid pressure reduction as the fluid flows therethrough. In other examples, however, the first and second chambers 356, 360 need not be so tapered.

The number of intermediate apertures 364 in each intermediate portion 344 preferably corresponds to the number of inlet apertures 336 and outlet apertures 340 associated with the respective intermediate portion 344. Thus, as an example, when the intermediate portion 344A is associated with eight inlet apertures 336 and eight outlet apertures 340, as it is in FIGS. 3B and 3C, the intermediate portion 344A preferably includes eight intermediate apertures 364. Each of the intermediate apertures 364 (in each intermediate portion 344) is oriented along a third axis (e.g., third axis 366) that is substantially parallel to but is spaced from the first and second axes (e.g., axes 326, 346). In the illustrated example, the intermediate apertures 364 in each intermediate portion 344 are all positioned above (i.e., closer to the top end 352 of the body 304 than) the inlet apertures 336 and the outlet apertures 340. In other examples, however, some or all of the intermediate apertures 364 can be positioned below or at the same level as the inlet apertures 336 and/or the outlet apertures 340.

Preferably, each outlet aperture 340 will have a diameter that is greater than a diameter of each of the intermediate flow apertures 364, which will in turn have a diameter that is greater than a diameter of each of the inlet apertures 336, such that the outlet apertures 340 have the largest diameter. In one example, each outlet aperture 340 has a diameter of approximately 0.16 inches, each intermediate flow aperture 364 has a diameter of approximately 0.14 inches, and each inlet aperture has a diameter of approximately 0.12 inches. In other examples, however, the diameter of the outlet apertures 340 can be less than the diameter of the intermediate flow apertures 364 and/or the inlet apertures 336. Moreover, in other examples, one or more inlet apertures 336 can have different diameters than one or more other inlet apertures 336 (e.g., inlet apertures 336 closer to the bottom end 348 of the body 304 can have a larger diameter than other inlet apertures 336), one or more outlet apertures 340 can have different diameters than one or more other outlet apertures 340 (e.g., outlet apertures 340 closer to the bottom end 348 of the body 304 can have a larger diameter than other outlet apertures 340), and/or one or more intermediate apertures 364 can have different diameters than one or more other intermediate apertures 364 (e.g., intermediate apertures 364 closer to the bottom end 348 of the body 304 can have a larger diameter than other intermediate apertures 364).

With each intermediate portion 344 so arranged, a substantial portion of the intermediate portion 344 of each of the flow paths 308 is oriented in a substantially vertical direction. And because in this example the intermediate portion 344 comprises a substantial portion of each of the flow paths 308 (albeit one that is shared with other flow paths 308), a substantial portion of each of the flow paths 308 in this example is oriented in the substantially vertical direction. In other examples, however, this need not be the case. In some examples, a greater portion of each intermediate section 344 can be oriented in a non-vertical direction, e.g., angled relative to the longitudinal axis 318. Alternatively or additionally, the inlet and outlet apertures 336, 340 may comprise a greater portion of each of the flow paths 308, such that the intermediate portions 344 comprise a majority, but not substantial, portion of each of the flow paths 308.

In addition to being substantially vertically oriented, the flow paths 308 span substantially the entire perimeter 316. In other words, the flow paths 308 are formed throughout the perimeter 316, from the bottom end 348 to the top end 352 of the body 304, thereby maximizing the lengths of the flow paths 308 by leaving little, if any, un-used upper dead space in the fluid pressure reduction device 300 (unlike conventional fluid pressure reduction devices).

When the fluid pressure reduction device 300 is in operation (in a valve body of a process control valve), and the valve plug is moved to a fully open position, thereby exposing all of the inlet apertures 336, fluid will flow from the valve body into the inlet apertures 336 of the flow paths 308 via the central opening 312. Fluid will then flow into and through the common intermediate portions 344 shared by the flow paths 308. As fluid travels upward (via the first chambers 356), fluid drags across or along an outer profile of the intermediate sections 344 while gravity acts on the fluid, thereby reducing the velocity of the fluid. The pressure of the fluid is thus reduced to a fluid pressure that is less than its initial fluid pressure. The first chambers 356 of the intermediate portions 344 will then feed the fluid into the intermediate apertures 364, respectively, which in turn pass the fluid into the second chambers 360, respectively. As fluid travels back downward (via the second chambers 360), fluid continues to drag across or along an outer profile of the intermediate portions 344, thereby further reducing the velocity of the fluid. The pressure of the fluid is thus further reduced. The reduced pressure fluid then flows out of the pressure reduction device 300 (and into the valve body) via the outlet apertures 340 of the flow paths 308. In this manner, the device 300 reduces the pressure of the fluid flowing therethrough (and thus through the process control valve). However, by employing complex flow paths 308 that utilize substantially the entire profile of the device 300 to do so, the device 300 more effectively reduces fluid pressure than conventional fluid pressure reduction devices. Additionally, by increasing the diameters of the apertures in each flow path 308 as fluid travels through the flow paths 308, additional pressure reduction is obtained beyond what is seen in conventional fluid pressure reduction devices. Furthermore, despite the fact that the outlet apertures 340 are spread out to help achieve the desired pressure reduction, the fluid pressure reduction device 300 does not require the usage of a larger actuator (i.e., an actuator with a longer travel stroke), because of the positioning of the inlet apertures 336 (which are not spread out in the same way as the outlet apertures 340).

It will also be appreciated that the fluid pressure reduction described above occurs even when the valve plug is moved to a partially open position, exposing one or more of the rows 328 of inlet apertures 336. In such a situation, fluid will flow from the valve body into the exposed inlet apertures 336 via the central opening 312. The fluid will then travel through the pressure reduction device 300 in the manner described above, taking advantage of all of the associated intermediate apertures 364 and outlet apertures 340 even though less than all of the inlet apertures 336 are exposed.

Figure 4:
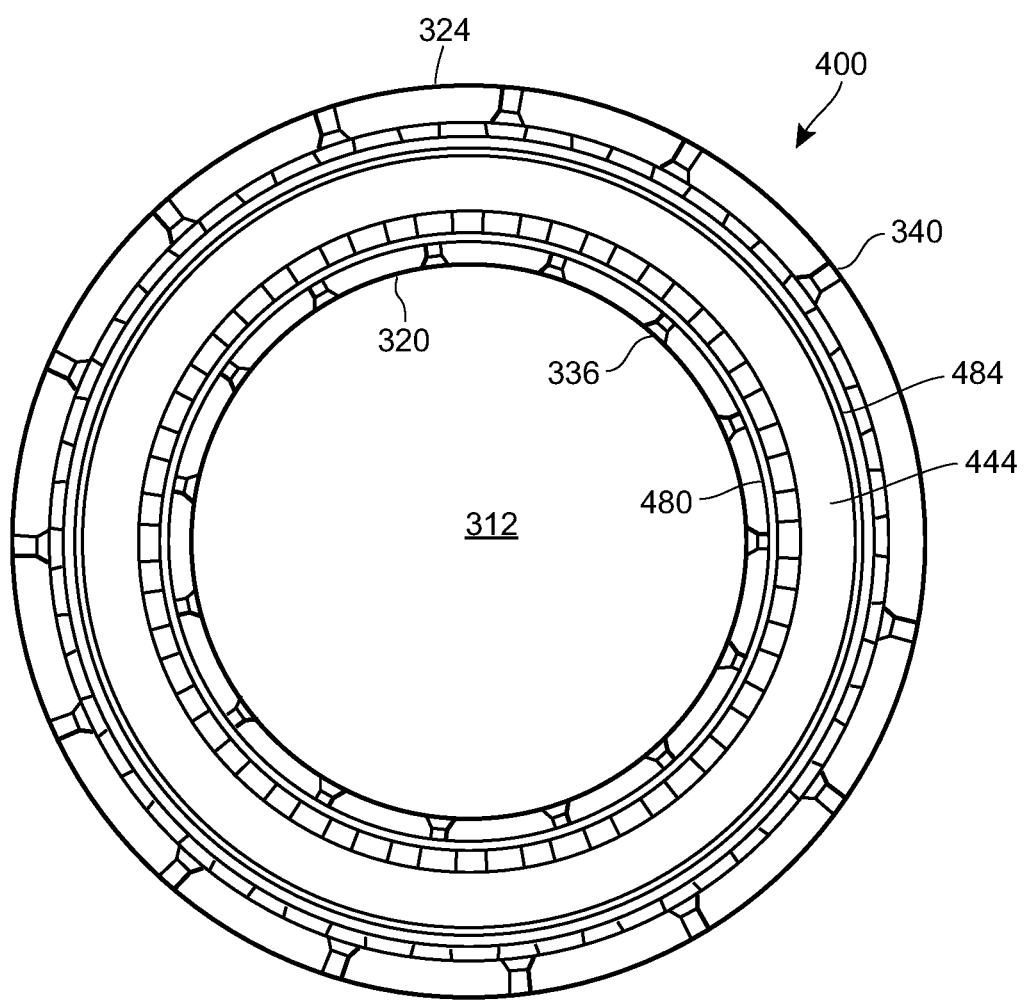
FIG. 4 is a cross-sectional view of a third example of a fluid pressure reduction device manufactured according to the process of FIG. 1.

FIG. 4 illustrates a third example of a fluid pressure reduction device 400 custom manufactured using the method or process 100. The fluid pressure reduction device 400 is substantially similar to the fluid pressure reduction device 300, with common components referred to using common reference numerals. However, instead of including a plurality of common intermediate sections 344 (as the device 300 does), the device 400 includes a single common intermediate section 444 that is circumferentially arranged around the entire central opening 312 of the body 304. The single common intermediate section 444 in this example is a curved plenum or area defined or formed between the inner walls 320, 324 of the body 304 (and thus the inlet apertures 336 and the outlet apertures 340, respectively). More particularly, the curved plenum or area is defined between a first intermediate wall 480, positioned immediately adjacent but radially outward of the inner wall 320 and in fluid communication with the inlet apertures 336, and a second intermediate wall 484, positioned immediately adjacent but radially inward of the outer wall 324 and in fluid communication with the outlet apertures 340. Thus, when fluid flows into the fluid pressure reduction device 400, it will flow into and through the single common intermediate section 444, regardless of where that fluid enters the fluid pressure reduction device 400.

The single common intermediate section 444, which may also be referred to as a pressure recovery plenum, is beneficial in a number of ways. First, the single common intermediate section 444 allows the device 400 to utilize the full annual area of the section 444 even when initially opening the valve plug. In other words, even as the valve plug first begins to move (either to a partially open or fully open position), thereby exposing one or more of the rows 328 of inlet apertures 336, fluid will flow into the single common intermediate section 444, taking full advantage of the full recovery (and pressure reducing) area of the intermediate section 444. Second, the single common intermediate section 444 allows the device 400 to fully utilize all of the outlet apertures 440 regardless of how open the valve plug is (i.e., where the valve plug is relative to the valve seat). As an example, even when the valve plug is only at 10% travel (i.e., has traveled 10% of the distance needed to move to its fully open position), such that two of the rows 328 of inlet apertures 336 are exposed, fluid will flow into and through the single common intermediate section 444, which then feeds all of the rows 345 of outlet apertures 340. In other words, all of the outlet apertures 340 can be utilized for pressure reduction even though only some of the inlet apertures 336 have been exposed. Third, and finally, the single common intermediate section 444 facilitates fluid interaction, as fluid that has passed through one of the inlet apertures 336 will collide with fluid that has passed through the other inlet apertures 336, thereby dissipating or absorbing kinetic energy in the fluid and stabilizing the fluid before entering the outlet apertures 340.

Preferred aspects of this invention are described herein, including the best mode or modes known to the inventors for carrying out the invention. Although numerous examples are shown and described herein, those of skill in the art will readily understand that details of the various aspects need not be mutually exclusive. Instead, those of skill in the art upon reading the teachings herein should be able to combine one or more features of one aspect with one or more features of the remaining aspects. Further, it also should be understood that the illustrated aspects are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspect or aspects of the invention, and do not pose a limitation on the scope of the invention. No language in the specification should be construed as indicating any non-claimed element as essential to the practice of the invention.

The invention claimed is:

1. A fluid pressure reduction device for use in a fluid flow control device, the fluid pressure reduction device comprising:
    a monolithic body having an inner wall and an outer wall spaced radially outward of the inner wall, the monolithic body extending along a longitudinal axis; and
    a plurality of flow paths defined between the inner wall and the outer wall of the monolithic body, each of the flow paths comprising an inlet aperture oriented along an inlet axis substantially perpendicular to the longitudinal axis, an outlet aperture oriented along an outlet axis substantially perpendicular to the longitudinal axis, and an intermediate section extending between the inlet and outlet apertures, wherein at least a majority of each intermediate section extends in a direction that is substantially parallel to the longitudinal axis,
    wherein the intermediate section of a first flow path of the plurality of flow paths is at least partially separate from the intermediate section of a second flow path of the plurality of flow paths.

2. The fluid pressure reduction device of claim 1, wherein the monolithic body has a length defined between a top end and a bottom end of the monolithic body, and wherein at least the portion of each intermediate section extending in the vertical direction travels at least a majority of the length of the monolithic body.

3. The fluid pressure reduction device of claim 1, wherein the first flow path has a first length and the second flow path has a second length different from the first length.

4. The fluid pressure reduction device of claim 1, further comprising a plurality of pressure restrictions defined in the intermediate section.

5. The fluid pressure reduction device of claim 1, wherein each intermediate section comprises a first vertical portion connected to the inlet aperture and substantially parallel to the longitudinal axis, a second vertical portion that is connected to the outlet aperture and substantially parallel to the longitudinal axis, and a curved portion that connects the first and second vertical portions.

6. The fluid pressure reduction device of claim 5, wherein the inlet and outlet apertures of each of the flow paths are positioned closer to a bottom end of the monolithic body than a top end of the monolithic body, and wherein the curved portion of each intermediate section is positioned closer to the top end of the monolithic body than the bottom end of the monolithic body.

7. The fluid pressure reduction device of claim 1, wherein each intermediate section comprises a first vertical portion that is connected to the inlet aperture and substantially parallel to the longitudinal axis, a second vertical portion that is connected to the outlet aperture and substantially parallel to the longitudinal axis, and a plurality of intermediate apertures that connect the first and second vertical portions and are substantially perpendicular to the longitudinal axis.

8. The fluid pressure reduction device of claim 7, wherein the inlet aperture of each of the flow paths has a first diameter, the intermediate apertures of each intermediate section each have a second diameter larger than the first diameter, and the outlet aperture of each of the flow paths has a third diameter larger than the second diameter.

9. The fluid pressure reduction device of claim 1, wherein a first intermediate section has a first length and a second intermediate section has a second length greater than the first length.

10. The fluid pressure reduction device of claim 1, wherein at least a majority of each of the flow paths is substantially parallel to the longitudinal axis.

11. The fluid pressure reduction device of claim 1, wherein the intermediate section of the first flow path is entirely separate from the intermediate section of the second flow path.

12. A fluid pressure reduction device for use in a fluid flow control device, the fluid pressure reduction device comprising:
    a monolithic body extending along a longitudinal axis and comprising a central opening and a perimeter surrounding the central opening, the perimeter having a top end and a bottom end opposite the top end;

a plurality of flow paths defined in the perimeter of the monolithic body, each of the flow paths comprising an inlet aperture oriented along an inlet axis substantially perpendicular to the longitudinal axis, an outlet aperture oriented along an outlet axis substantially perpendicular to the longitudinal axis, and an intermediate section connecting the inlet and outlet apertures, wherein each intermediate section extends between the bottom end of the monolithic body and the top end of the monolithic body, wherein a majority of each of the flow paths extends in a direction that is substantially parallel to the longitudinal axis, and wherein the intermediate section of a first flow path of the plurality of flow paths is at least partially separate from the intermediate section of a second flow path of the plurality of flow paths.

13. The fluid pressure reduction device of claim 12, wherein the perimeter is defined by an inner wall and an outer wall spaced radially outward of the inner wall, and wherein the flow paths are defined between the inner wall and the outer wall.

14. The fluid pressure reduction device of claim 12, wherein the first flow path has a first length and a second flow path has a second length different from the first length.

15. The fluid pressure reduction device of claim 12, wherein each intermediate section comprises a first vertical portion that is connected to the inlet aperture and substantially parallel to the longitudinal axis, a second vertical portion that is connected to the outlet section and substantially parallel to the longitudinal axis, and a curved portion that connects the first and second vertical portions.

16. The fluid pressure reduction device of claim 15, wherein the inlet and outlet apertures of each of the flow paths are positioned closer to the bottom end of the monolithic body than the top end of the monolithic body, and wherein the curved portion of each intermediate section is positioned closer to the top end of the monolithic body than the bottom end of the monolithic body.

17. The fluid pressure reduction device of claim 12, wherein each intermediate section comprises a first vertical portion that is connected to the inlet aperture and substantially parallel to the longitudinal axis, a second vertical portion that is connected to the outlet aperture and substantially parallel to the longitudinal axis, and a plurality of intermediate apertures that connect the first and second vertical portions and are substantially perpendicular to the longitudinal axis.

18. The fluid pressure reduction device of claim 17, wherein the inlet aperture of each of the flow paths has a first diameter, each of the intermediate apertures has a second diameter larger than the first diameter, and the outlet aperture of each of the flow paths has a third diameter larger than the second diameter.

19. A method of manufacturing, comprising:
creating a fluid pressure reduction device using an additive manufacturing technique, the creating comprising:
forming a monolithic body having an inner wall and an outer wall spaced radially outward of the inner wall, the monolithic body extending along a longitudinal axis; and
forming a plurality of flow paths in the monolithic body between the inner wall and the outer wall of the body, each of the flow paths comprising an inlet aperture oriented along an inlet axis substantially perpendicular to the longitudinal axis, an outlet aperture oriented along an outlet axis substantially perpendicular to the longitudinal axis, and an intermediate section extending between the inlet and outlet apertures, wherein at least a majority of each intermediate section extends in a direction that is substantially parallel to the longitudinal axis, and wherein the intermediate section of a first flow path of the plurality of flow paths is at least partially separate from the intermediate section of a second flow path of the plurality of flow paths.

20. The method of claim 19, wherein the additive manufacturing technique comprises 3-D printing.

21. The method of claim 19, wherein each intermediate section comprises a first vertical portion connected to the inlet section and being substantially parallel to the longitudinal axis, a second vertical portion that is connected to the outlet section and being substantially parallel to the longitudinal axis, and a curved portion that connects the first and second vertical portions.

22. The method of claim 19, wherein each intermediate section comprises a first vertical portion that is connected to the inlet aperture and substantially parallel to the longitudinal axis, a second vertical portion that is connected to the outlet aperture and being substantially parallel to the longitudinal axis, and a plurality of intermediate apertures that connect the first and second vertical portions and are substantially perpendicular to the longitudinal axis.

* * * * *